July 20, 1954    G. A. BRACE    2,684,125
SUCTION CLEANER HAVING MULTIPLE CONCENTRIC FILTERS
Filed May 31, 1952    3 Sheets-Sheet 1

INVENTOR.
George A. Brace
BY *Alfred G. Gross*
ATTORNEY.

July 20, 1954 G. A. BRACE 2,684,125
SUCTION CLEANER HAVING MULTIPLE CONCENTRIC FILTERS
Filed May 31, 1952 3 Sheets-Sheet 2
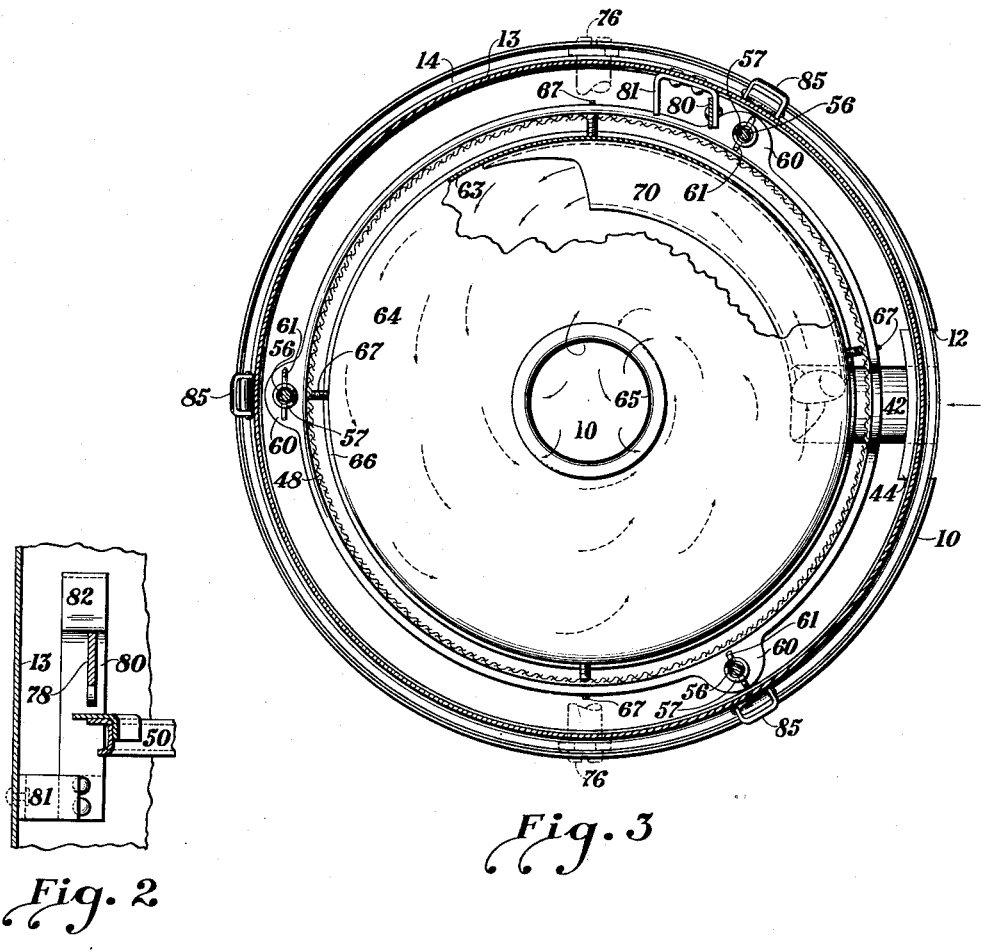
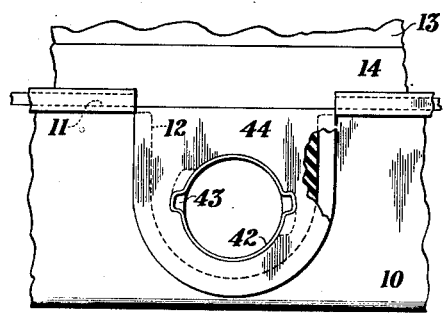
INVENTOR.
George A. Brace
BY
ATTORNEY.

July 20, 1954  G. A. BRACE  2,684,125
SUCTION CLEANER HAVING MULTIPLE CONCENTRIC FILTERS
Filed May 31, 1952  3 Sheets-Sheet 3

INVENTOR.
George A. Brace
BY Alfred S. Gross
ATTORNEY.

Patented July 20, 1954

2,684,125

UNITED STATES PATENT OFFICE 2,684,125

SUCTION CLEANER HAVING MULTIPLE CONCENTRIC FILTERS

George A. Brace, Highland Park, Ill., assignor to The Hoover Company, North Canton, Ohio, a corporation of Ohio Application May 31, 1952, Serial No. 290,923

31 Claims. (Cl. 183—37)

My invention relates to the art of suction cleaners and in particular to a canister type cleaner characterized by the provision of a plurality of concentrically arranged dirt separating devices all arranged to discharge into a common, removable dirt receptacle.

The efficiency of a suction cleaning device is directly dependent upon the efficiency of the dirt separators which must insure complete removal of the finest particles of dirt without producing an unduly high air flow resistance. It is highly important to the continued effective functioning of a suction cleaner filter that the area thereof be as large as possible and that the effectiveness of the filter be maintained despite the collection of a large volume of dirt within the cleaner. Some types of suction cleaners have a filter so arranged that the separated dirt collects on large areas of the filter and greatly impairs its efficiency soon after the cleaner is placed in use. For most effective use of a fabric filter, it is desirable to prevent the dirt from impinging on the filter and to remove the fine particles which unavoidably collect at frequent intervals. The dislodged fines should be isolated in an inactive or dead air space in such manner that they cannot be picked up by the air stream and redeposited on the filter.

It is a principal object of the present invention to provide a very compact suction cleaner having a cyclone main filter arranged in series with an air pervious final filter both of which have a common dirt storing receptacle.

It is a further object of the present invention to provide a suction cleaner of the above described character employing a shaking mechanism for the final filter in which the dislodged fines gravitate into a dead air space in which they are isolated from the main air stream.

Another object of the present invention is to provide a suction cleaner in which the cyclone separator is nested within the final filter.

A further object is the provision of a suction cleaner in which the main and final filters are nested and open downwardly into an easily detachable dirt collecting receptacle.

Yet another object is the provision of unique mounting means for the main and final filters which makes use of the shaker spring for resiliently sealing both filters against the dirt receptacle.

A further object of the invention is the provision of a cleaner readily separable into two parts one of which includes only the dirt receptacle, as well as an arrangement in which the removal of the dirt receptacle exposes the two filters for easy removal or servicing.

Another object is the provision of a simple construction in which the shaker mechanism for the final filter serves to support the main filter.

A further object is the use of a common carrying handle for the cleaner and manual actuator for the filter shaking mechanism.

Other objects and advantages of the invention will become apparent as the description proceeds when taken in connection with the accompanying drawings, wherein:

Figure 2 is a detailed sectional view taken along the line 2—2 of Figure 1;

Figure 3 is a transverse sectional view taken along the line 3—3 of Figure 1;

Figure 4 is a fragmentary view taken at right angles to Figure 1 illustrating the suction hose connection;

Figure 5:
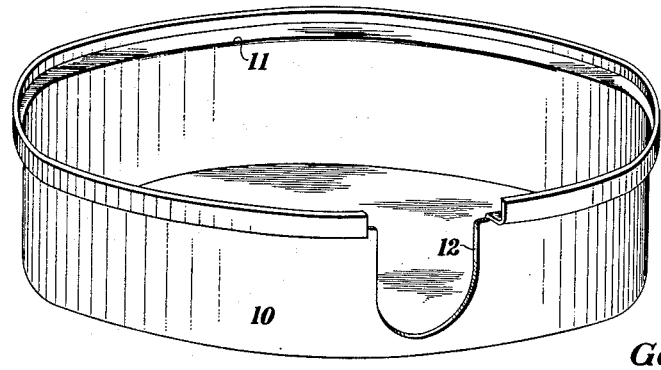
Figure 5 is a perspective view of a dirt pan.

The illustrated embodiment of the invention comprises a combined base and dirt collecting pan 10 having the general shape shown in Figure 5. A flanged shoulder 11 encircles the rim of the pan except for a U-shape cut-out 12 in the side of the dirt pan to receive the suction hose coupling. The motor-fan unit and filter assembly is housed in a cylindrical casing 13 the lower rim of which is provided with a resilient sealing gasket 14 adapted to seat upon flange 11 of the dirt pan.

An annular supporting ring 15 secured within the upper end of casing 13 supports the motor-fan unit 16 between a pair of resilient annular members 17 and 18. The latter are secured to ring 15 by an annular plate 19 as by self-tapping screws.

Motor-fan unit 16 comprises an electric driving motor 23 provided with a shaft, not shown, upon which are mounted a pair of fans 24 separated by a stationary inter-stage structure 25. The fans are housed in fan casing 26 having an axial air inlet opening 27. The upper fan discharges through one or more peripheral openings 39 into the motor housing where the air is utilized to cool the motor as it passes to the discharge opening 38. The motor-fan unit is of conventional design and forms no part of my invention.

The upper end of casing 13 is enclosed by a dome-shaped cap 32 having a flanged rim 33 engaging sealing gasket 34. The cap and gasket are held assembled to flange 35 by screws or the like 36. The usual service cord 39 is connected to the motor and extends through the side of cap 32 where it is protected by a rubber grommet 40.

Figure 1:
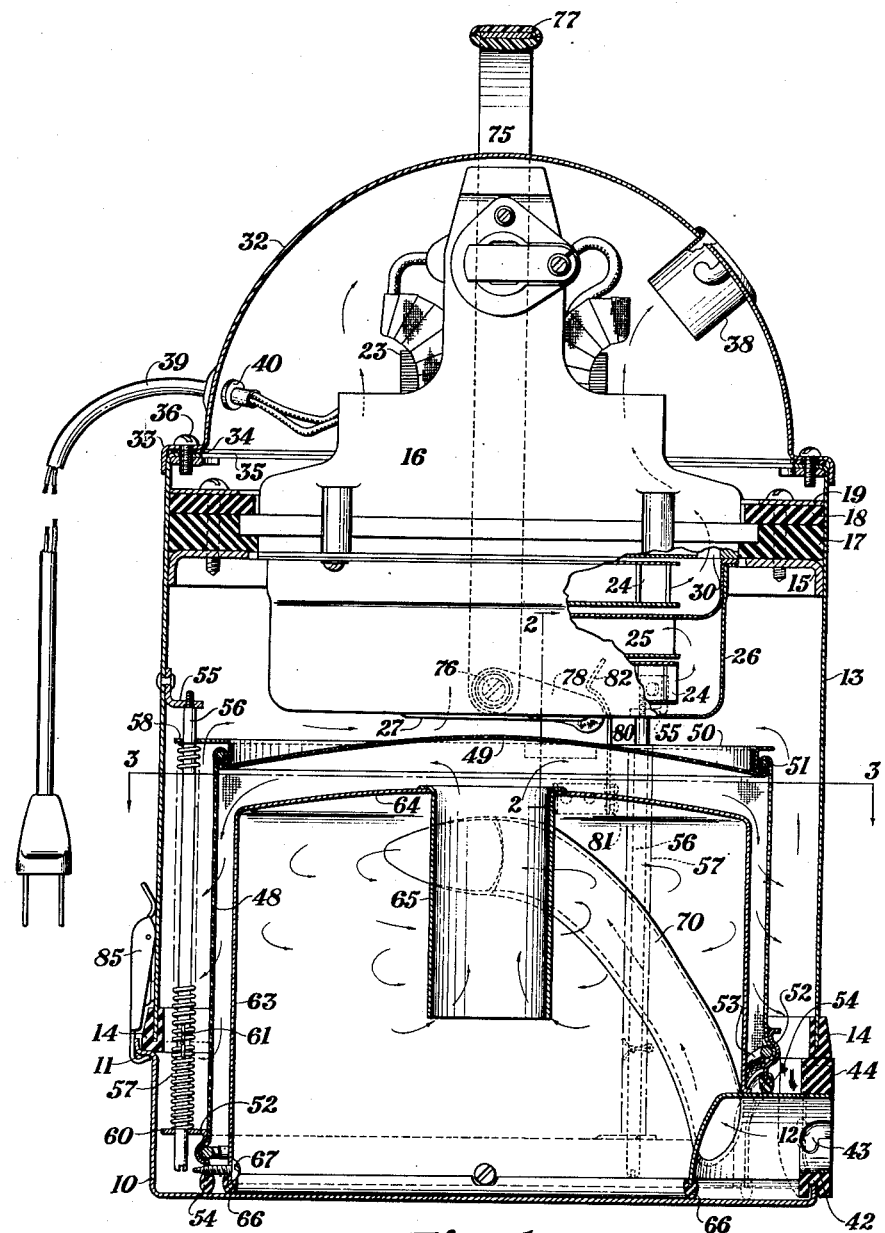
Figure 1 is a sectional elevation view of a suction cleaner apparatus employing my invention.

As shown most clearly in Figures 1 and 4, the suction inlet for the cleaner comprises a coupling member 42 having a bayonet connector 43 for detachably joining the usual suction hose to the cleaner. Surrounding the outer end of member 42 is a resilient sealing grommet 44 having a flat upper face which seats against gasket 14 of casing 13. The lower face of the grommet seals against the edge of cut-out 12 of the dirt pan 10. The lower side of member 42 is open and carries a portion of gasket 66 to form an airtight seal between the bottom of the dirt pan and the lower edge of member 42. Thus, the inner end of member 42 forms an expansion chamber which functions as a trap for heavy foreign articles entrained in the dirty air stream.

The lower half of the cleaner casing houses the unique filter assembly forming an important feature of the invention. This assembly comprises an inverted cloth bag final filter 48 and an imperforate main dirt separator generally indicated at 63. The lower rim of the final filter is secured to a ring 52 by means of a spring keeper ring 53. Note that ring 52 is shaped to embrace tubular inlet member 42 in the manner best shown in Figure 1. The lower edge of this ring is provided with a sealing gasket 54 which normally seats upon the bottom surface of the dirt pan and the outer wall of member 42 in an airtight manner.

A plurality of lugs 60 extend radially from ring 52 and are provided with openings through which rods 56 loosely extend. The threaded upper ends of these rods are supported in brackets 55 secured to the inner wall of casing 13. Note that the lower ends of the rods are slotted to receive a screw driver and terminate somewhat above the bottom of pan 10. Rods 56 are surrounded by compression springs 57. The lower ends of these springs seat on lugs 60 and the upper ends seat against lugs 58 projecting horizontally from a flanged ring 50 mounted in the rim of the filter bag 48 by means of a wire ring 51. Cotter pins 61 extend through openings in rods 56 and between the turns of springs 57 adjacent these openings thereby separating each spring into lower and upper sections. In consequence, the portions of springs 57 below the cotter pins are effective to hold the filter assembly firmly but resiliently seated on the bottom of the dirt pan. The portions of springs 57 above the cotter pins 61 bear upon the lugs 58 and have several functions. For example, they hold the final filter firmly tensioned and in the proper space relation between the cleaner casing and the side wall of the main dirt separator 63. Another function is to hold the entire filter assembly in assembled position in the cleaner while permitting the final filter to be collapsed during the operation of the shaker mechanism. And, of course, the upper portions of springs 57 act to tension the final filter abruptly to dislodge adhering dirt when the shaker handle is depressed and then released.

Nested within the final filter is a main dirt separator comprising a cyclone type filter generally indicated at 63. This separator includes an inverted cup-shaped imperforate member having an open ended tube extending downwardly from top wall 64 and forming an exit passage for the partially cleaned air. Spiraling upwardly against the inner wall of the separator from inlet tube 42 is a conduit 70 which discharges the incoming dirty air tangentially into the upper end of the cyclone chamber. Separator 63 is removably connected to ring 52 of the final filter as by screws 67, and its lower rim carries a resilient sealing gasket 66 which is held seated on the bottom of the dirt pan by the lower ends of springs 57 as is self-evident from Figure 1.

Figure 6:
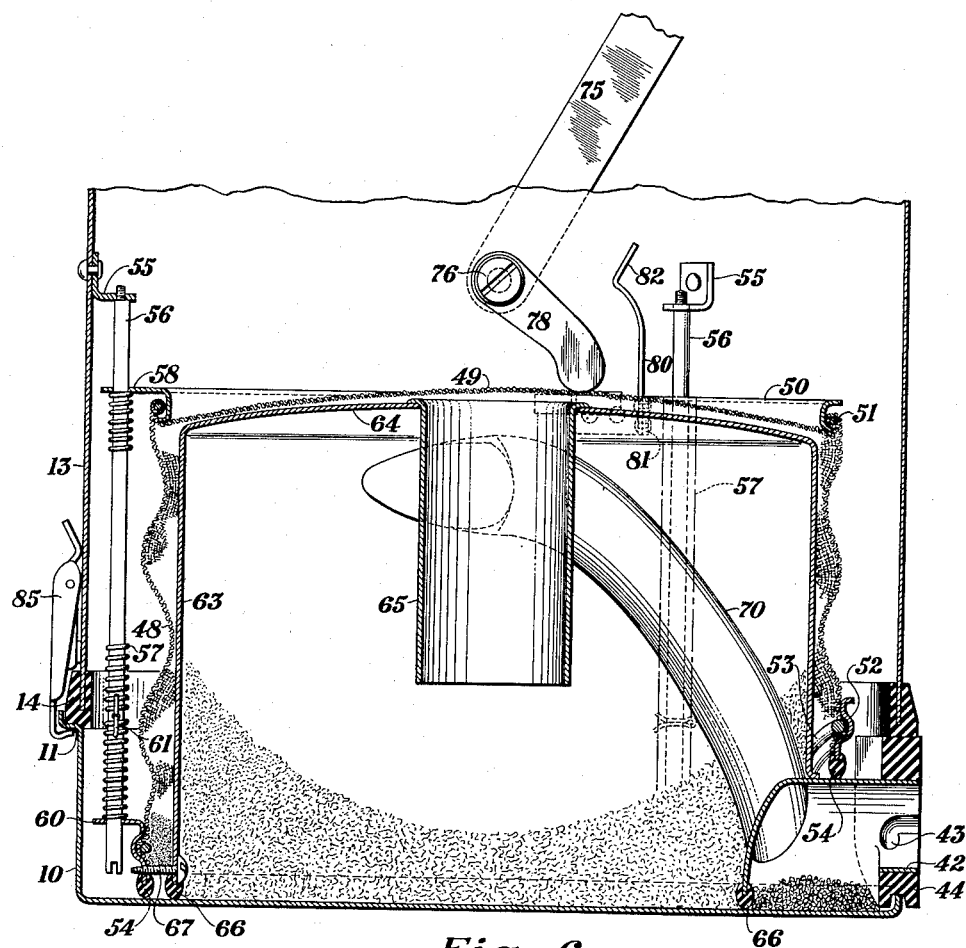
Figure 6 is a fragmentary view similar to Figure 1 illustrating the operation of the shaker mechanism.

The combined carrying handle and actuator for the filter shaking mechanism comprises a U-shaped bail 75 pivotally connected to the opposite sides of casing 13 by pivot pins 76 rigid with the bail. The top of the bail carries a handle grip 77. Rigidly secured to the inner ends of pins 76 are a pair of arms 78, the outer rounded ends of which are normally closely spaced above flange ring 50 when the bail is in its upright position, as clearly appears from Figure 1. Consequently, as the handle is pivoted to the right, arms 78 contact ring 50 and depress it downwardly along guide rods 56 compressing the upper ends of springs 57. This action allows the walls of the final filter to relax into the wrinkled or corrugated shape illustrated in Figure 6. If the operator then releases her grasp of handle 77, spring 57 will snap the walls of the filter taut abruptly dislodging the fine dirt adhering to the wall thereof. This dirt will fall into an annular dead air space formed by pan 10 and the adjacent portions of cylindrical walls of filters 48 and 63. Since no air is circulating in this space, the dirt will remain where it falls. If a single operation of the shaker does not suffice to dislodge the dirt, one or more additional operations may be used to insure complete reconditioning of the filter. Of course, the cyclone filter operates at full efficiency at all times since all separated dirt collects in the dirt pan and since it has no small openings to become clogged with dirt.

If desired, the handle may be provided with a resilient catch for holding it in an upright position in readiness to be grasped for carrying the cleaner from place to place or for operating the filter shaker. This catch comprises a simple leaf spring 80 supported on the cleaner casing by bracket 81. The upper end 82 is shaped as shown and positioned in the path of one of the arms 78. It will therefore be clear that this catch is effective to hold the handle in the upright position, or to permit the handle to be pivoted to the left and down against the side of the cleaner. When again swung upwardly, arm 78 flexes the spring to the right until the cammed upper end is by-passed after which the spring holds the handle in the vertical position illustrated.

*Operation*

To place the cleaner in operation, the operator couples an end of the usual flexible hose to coupling 42 and closes the switch to the motor-fan unit. The dirty air stream deposits any heavy foreign articles entrained therewith in the expansion chamber formed by the enlarged inner end of member 42. This foreign matter drops onto the bottom of the dirt receptacle while the remainder of the dirty air flows upwardly through passage 70 and discharges tangentially into the upper portions of the cyclone chamber. As the air spirals about the exit tube 65, substantially all the dirt except the extremely fine portions settle out and fall into the dirt pan. The air then flows upwardly through conduit 65. Some of the air passes through bottom 49 of the final filter while the remainder flows into the annular passage surrounding the exterior of cyclone 63 and then passes through the side walls of the filter bag 48 leaving all the fine dirt on the interior of the bag. The clean air then flows upwardly into eye 27 of the suction fan from which it discharges through openings 30 into the interior of the driving motor 23. As the air flows through the motor, it cools it before discharging from the cleaner through coupling 38.

Much of the fine dirt collected by the final filter settles into the dead air space between the bottom of filters 48 and 63. However, some of the dirt will adhere to the final filter to an objectionable extent. When this occurs, the final filter may be quickly and easily reconditioned. Preferably the motor is deenergized during the cleaning operation. The combined carrying and shaking handle 77 is then pivoted counter-clockwise so that arms 78 rigid therewith cause ring 50 to be depressed along guide rods 56 thereby compressing the upper sections of springs 57. Ring 50 will slide downwardly on rods 56 in a horizontal position due to the angular relationship of arms 78 with respect to the three guide rods 56 and the springs 57 mounted thereon. This will be best understood by reference to Figures 1 and 3 from which it will be observed that the point of contact of arms 78 with ring 50 is relatively close to and equally spaced from the two rods 56 to the right of these arms as viewed in Figure 3. The remaining rod to the left is much further away from arm 78 as it should be in order for the left hand spring 57 to counter-balance the effectiveness of the two remaining springs which are located on the arms 78. If the operator now releases her grasp of handle 77, springs 57 will force ring 50 upwardly along the guide rod and snap the side walls of the final filter taut abruptly to dislodge the fine dirt which settles into the annular space at the bottom of the filter. The shaker mechanism may be operated several times if necessary to insure complete cleaning. The cleaner is now restored to its full operating efficiency and the cleaning operation may be continued by reenergizing the motor.

Emptying of the cleaner is a very simple operation. The operator merely releases the toggle clamp 85 clamping the dirt pan 10 to the remainder of the cleaner casing. The operator then lifts the top of the cleaner proper vertically off the dirt pan leaving all of the dirt behind in the pan. This includes the heavy foreign articles separated at the bottom of tubular inlet member 42, the main body of dirt collected by the cyclone and the fine dirt separated by the final filter. After removal, the top portion of the cleaner is placed on the floor to one side of the dirt pan where it is supported by the lower ends of guide rods 56 since the portions of springs 57 below cotter pins 61 are not strong enough to support the weight of the entire cleaner. After the collected dirt has been emptied from the pan, the cleaner is reassembled onto the dirt pan and clamps 85 are closed.

If it is desired to use the cleaner as a blower for spraying or for cleaning by blowing, it is merely necessary to detach the suction hose from coupling 42 and couple it to the discharge coupling 38 at the top of the cleaner. When the motor is energized, air enters through tube 42, flows through the filter assembly, through the motor-fan unit and is then exhausted under pressure through hose coupling 38.

Servicing of the cleaner is also a very simple operation. For example, the entire filter assembly may be quickly removed from the casing by first removing the dirt pan and then unscrewing guide rods 56 whereupon the entire filter assembly including the shaker mechanism can be withdrawn from the bottom end of casing 13. Note that all of the parts of assembly are held in their assembled position as the unit is removed from the casing. The cyclone may be removed merely by withdrawing retaining screws 67. If it is desired to place the final filter, cotter pins 61 are removed so that rods 56 can be withdrawn. Keeper rings 53 and 51 are then removed whereupon a new filter bag can be clamped in place by replacing keeper rings 51 and 53.

Access to the motor-fan unit is gained by removing dome 32 thereby giving access to the motor brushes at the top ends of the motor 23. If it should be desirable to remove the entire unit, this may be done by withdrawing the keeper screws and the resilient mounting rings for this unit.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. Suction cleaning apparatus comprising a casing, suction creating means in said casing, said casing including a dirt collecting receptacle, a plurality of rods carried by said casing extending toward and terminating in spaced relation to the bottom of said receptacle, a filter in said casing, a spring on each of said rods, means securing a central portion of each of said springs to its associated rod, means interconnecting the opposite ends of said filter to opposite ends of each of said springs whereby said springs tension said filter.

2. Suction cleaning apparatus comprising a casing having an open bottom, a dirt receptacle detachably secured to said casing and closing the bottom thereof, a motor-fan unit mounted in the upper portion of said casing having an air inlet, a plurality of rods secured to the interior wall of said casing extending toward and terminating in spaced relation to the base of said receptacle, a spring on at least two of said rods, means securing an intermediate portion of each of said springs to said rods, an upper filter support slidably mounted on said rods and bearing on the upper ends of said springs, a lower filter support slidably mounted on said rods and bearing on the lower ends of said springs, said lower filter support having a resilient sealing member resiliently urged against said dirt receptacle by the lower portions of said springs, a fabric filter having an open end secured to said lower support and a closed end secured to said upper support and tensioned by said springs, and means for introducing dirt laden air into said filter 3. A suction cleaning apparatus according to claim 2 including a carrying handle movably attached to said casing, and means actuated by a predetermined movement of said handle for moving said upper support along said rods in opposition to said springs to relax said filter whereby said springs impart a sudden snapping action to said filter when said handle is released.

4. Apparatus according to claim 2 in which said dirt laden air introducing means includes an open bottom centrifugal separator nested within said filter in spaced relation thereto and having a discharge port to the interior of said filter, said centrifugal separator being secured to said lower support and having a sealing member on its lower end resiliently engaged with said dirt receptacle by the lower portions of said springs.

5. In a suction cleaning apparatus comprising a casing having an open bottom, a dirt pan having an upstanding rim detachably engaging the lower rim of said casing, a motor-fan unit in said casing having an air inlet spaced above said dirt pan and opening into the chamber formed by said dirt pan and casing, a filter in said casing having a closed end and an open end, an open ended centrifugal separator nested in said filter in spaced relation thereto, means for supporting said filter and separator on said casing including spring means resiliently pressing the open ends of said filter and said separator into engagement with said dirt pan, and means for conducting a dirt laden air stream into said centrifugal separator.

6. Suction cleaning apparatus comprising a casing having a detachable bottom forming a dirt pan, a motor-fan unit in said casing dividing the same into an upper air discharge chamber and a lower air inlet chamber, a filter assembly in said air inlet chamber comprising a final filter having an open bottom, a centrifugal separator nested within said final filter having an open bottom portion, an air inlet means and an air duct discharging to the space between said filter and said separator, means for supporting said filter and separator on said casing including resilient means carried by said casing pressing the open ends of said filter and said separator into engagement with said dirt pan, and means for conducting dirt laden air into said separator.

7. Apparatus according to claim 6 including an impervious sealing ring attached to the open bottom of said filter and means securing said separator to said ring in spaced relation thereto to form a dead air space between said filter and said separator at the lower ends thereof.

8. Apparatus according to claim 6 in which said air conducting means includes an expansion chamber attached to said separator to form a heavy article trap, said expansion chamber having an open bottom resting on said dirt pan, and means for shaking said filter to remove dirt therefrom into said dead air space, whereby material removed by said expansion chamber and said filter and said separator is deposited in said dirt pan.

9. Suction cleaning apparatus comprising a casing having a detachable bottom forming a dirt pan, a motor-fan unit in said casing separating the same into an upper air discharge chamber and a lower filtering chamber, a plurality of rods supported on the inner wall of said casing and terminating in spaced relation to the bottom of said pan, a pair of rings slidably mounted on said rods, a compression spring on each of said rods biasing said rings apart, a tubular filter having its opposite ends secured to said pair of rings so as to be held taut by said springs, means for utilizing the lower ends of said springs to hold the lower end of said filter sealed against the bottom of said filter chamber, and means for conducting an air stream into said filtering chamber.

10. Apparatus according to claim 9 in which said air conducting means includes a centrifugal separator nested within said tubular filter in spaced relation thereto and having an open bottom resting on a wall of said filtering chamber, and means for securing the lower end of said separator to said lower filter ring whereby said springs also bias said separator into contact with the wall of said filtering chamber.

11. Apparatus according to claim 7 in which said air conducting means also includes a conduit attached to and terminating in said separator and having an expansion chamber forming a heavy article trap, said expansion chamber having an open side resting on a wall of said filtering chamber.

12. Suction cleaning apparatus comprising a casing having a detachable bottom forming a dirt pan, a motor-fan unit in said casing separating the same into an upper air discharge chamber and a lower filtering chamber, a filter bag in said lower chamber having a bottom opposite said motor-fan unit and an open end resting on said dirt pan, a centrifugal separator in said filter in spaced relation thereto comprising a cylinder having an open end resting on said dirt pan and a closed end closely spaced from said filter bag bottom, an exhaust conduit extending downwardly through the closed end of said separator and terminating in spaced relation above the bottom of said dirt pan, and means for discharging dirt laden air tangentially into said cylinder adjacent the closed end thereof.

13. A unitary filter assembly for a suction cleaner comprising, an inverted cup-shaped imperforate member having an air inlet passage opening tangentially into the upper end thereof for delivering a dirt laden air stream thereto, a tubular air discharge tube positioned centrally of said member and opening upwardly through the top thereof, a final filter bag having a bottom closely spaced above the top of said imperforate member and having side walls closely spaced from the side walls of said imperforate member and terminating in substantially the same plane as the lower end of said imperforate member, frame means supporting the lower ends of said filter bag and said imperforate member, a second frame connected to the closed upper end of said filter bag, means including springs interconnecting said two frames and normally urging the same apart so as to hold the side walls of said filter bag taut.

14. A unitary filter assembly as defined in claim 13 including guide rods slidably supported in said two frames, and means interconnecting said rods and springs for holding said rods in place with said frames while leaving each of said frames free to move toward and away from each other along said guide rods.

15. A unitary filter assembly as defined in claim 14 wherein said springs are coiled about said guide rods and are connected thereto at a point intermediate said frames and intermediate the ends of said springs whereby each frame is movable along said guide rods independently of the other frame and whereby only the upper ends of said springs are effective against the upper frame and only the lower ends of said springs are effective against the lower frame.

16. In combination with a casing having side and end walls, a flexible tubular filter housed within said casing having an open end adapted to be closed normally by contact with a wall of said casing, and means for supporting said filter within said casing and maintaining the walls thereof normally taut comprising a plurality of springs arranged between said casing and the exterior wall of said filter and having their opposite ends connected to the opposite ends of said filter so as to hold the same taut, support means connecting said springs to said casing at a point intermediate the ends of said springs whereby one end of said springs acts to resiliently hold one end of said tubular filter sealed against a wall of said casing and whereby the opposite ends of said springs act to urge the other end of said filter away from said last mentioned wall.

17. The combination defined in claim 16 wherein said means connecting said springs to said casing comprises rods extending longitudinally of said tubular filter and wherein said springs are coiled about said rods.

18. The combination defined in claim 17 including means for relaxing the tension on said filter temporarily and then tensioning the same abruptly to dislodge dirt therefrom, said means including a manually operable lever means projecting through the wall of said casing, the inner end of said lever being operable when moved in one direction to compress the innermost ends of said springs so as to relax the walls of said filter while leaving the other ends of said springs free to maintain the opposite end of the filter in air tight engagement with the wall of said casing, and said springs being operable when said lever is released by the operator to snap said filter taut abruptly to dislodge dirt therefrom.

19. The combination defined in claim 18 wherein said wall closing one end of said filter is removably secured to said casing to give access to said filter when removed.

20. In combination, a casing having a removable wall releasably secured thereto, a filter bag having an open end and a closed end, means for supporting said bag within said casing and for holding the walls thereof normally taut, said supporting means comprising a plurality of rods arranged lengthwise of said bag closely adjacent the exterior walls thereof, means rigidly connecting one end of said rods to said casing, coil compression springs surrounding said rods and having their mid-portions secured to said rods, means for connecting the opposite ends of said springs to the opposite ends of said bag so as to hold the walls thereof taut and for holding the open end of said filter seated against said removable wall in an air tight manner.

21. The combination defined in claim 20 wherein said removable casing wall is cup-shaped and forms a receptacle for holding the dirt collected by said filter which is removable from said casing to facilitate the disposal of the collected dirt.

22. The combination defined in claim 20 wherein said removable dirt receptacle has an opening in the side wall thereof, and means forming an air stream passageway having its inner end extending thru the side wall of said filter bag and its outer end adapted to extend thru the opening in said dirt receptacle in air tight engagement therewith, said receptacle being freely removable from said passageway means during the removal of said receptacle from said casing to empty the dirt collected therein.

23. The combination defined in claim 20 including mechanical dirt separating means housing within said filter bag, said separator comprising a cup-shaped member having its open end in the same plane as the open end of said filter bag, supporting means therefor interconnecting the open ends of said filter bag and said separator, an air discharge opening between the interior of said air separator and the interior of said filter bag, and means for connecting the inner end of said inlet passageway to the interior of said separator so that the incoming air stream flows first into said separator and thereafter into said filter bag.

24. The combination defined in claim 23 wherein said separator includes a tube having one end secured to the said air discharge opening and the other end terminating centrally of said separator and facing said removable casing wall.

25. The combination defined in claim 23 wherein said inlet passageway means has an open side in the same plane with the open ends of said bag and said separator and cooperating with said removable casing wall to provide a heavy article trap in advance of said separator.

26. Suction cleaning apparatus comprising a casing, a removable dirt pan attached to the lower part of the casing, a tubular filter having an open lower end and a closed upper end, means on the casing supporting the filter including means for resiliently holding the open lower end of the filter in air tight engagement with the dirt pan whereby dirt accumulating within the filter may drop into the dirt pan and be removed by removing the dirt pan, a suction creating unit mounted in the casing and arranged to create a low-pressure zone in the part of the casing housing the filter, and means for leading a dirt laden cleaning air stream into the interior of the filter.

27. Suction cleaning apparatus comprising a casing, a dirt pan removably secured to the lower part of the casing, a suction air pump in the upper part of the casing, a tubular filter having a closed upper end and an open lower end, a centrifugal dirt separator nested within and spaced from the tubular filter and having an open dirt discharging lower end, means on the casing supporting the filter and dirt separator and holding the open lower ends thereof in air sealed engagement with the dirt pan whereby the filter and separator each discharge separated dirt into the same dirt pan, said separator having an air discharge port opening into the interior of the tubular filter, and means for conveying dirt laden air into the interior of the separator.

28. Suction cleaning apparatus comprising a casing, a suction creating means in said casing, a tubular filter in said casing having a closed end spaced from and adjacent to said suction creating means, a dirt receptacle on said casing, means on the casing biasing the open end of the filter into air tight relation to the receptacle, means on the casing biasing the closed end of the filter toward the suction creating means to hold the filter taut, said second mentioned biasing means exerting less force than said first mentioned biasing means whereby said filter is maintained taut and in air sealed relation to the dirt receptacle, and means for leading a dirt laden cleaning air stream into the interior of said tubular filter.

29. Apparatus according to claim 28 including filter cleaning means having a manually operated part on the exterior of the casing and an actuating part within the casing for moving the filter against the force of the means biasing the closed end of the filter to relax the filter whereby the filter is snapped taut by the biasing means when the manually operated part is operated to relax the filter and then released.

30. Apparatus according to claim 29 wherein the said manually operated part comprises a bail type carrying handle pivotally attached to the casing, and a resilient stop member mounted on the casing in the path of movement of a part of said filter cleaning means to limit pivotal movement of the handle induced by the filter biasing means when the handle is released after relaxing the filter.

31. In combination, a casing having a removable cup-shaped member forming a dirt receptacle, a cyclone type dirt separator within said casing having an open end adapted to be held in air tight engagement with the bottom of said receptacle, a tubular member having one end extending through the opposite closed end of said cyclone and its opposite end facing said receptacle bottom in spaced relation thereto, conduit means having an enlarged section provided with an opening lying in the same plane as the open end of the dirt separator, said conduit means having one end projecting through the casing wall and its other end discharging tangentially into the dirt separator near the closed end thereof, and means supporting the dirt separator within said casing including spring means resilient holding the open end of the dirt separator and the open portion of the conduit in engagement with the dirt receptacle in an air tight manner whereby the enlarged portion of the conduit cooperates with a portion of the dirt receptacle to form a heavy article separator in advance of the cyclone dirt separator.

References Cited in the file of this patent

UNITED STATES PATENTS

| Number | Name | Date |
|---|---|---|
| 2,116,233 | Cole | May 3, 1938 |
| 2,247,472 | Bible | July 1, 1941 |
| 2,266,976 | Leathers | Dec. 23, 1941 |
| 2,295,984 | Wilson | Sept. 15, 1942 |
| 2,463,435 | Smellie | Mar. 1, 1949 |
| 2,494,981 | Acheson | Jan. 17, 1950 |
| 2,594,456 | Kronlein | Apr. 29, 1952 |
| 2,608,268 | Gerber | Aug. 26, 1952 |